(12) United States Patent
Anderson et al.

(10) Patent No.: US 6,374,239 B1
(45) Date of Patent: Apr. 16, 2002

(54) METHOD AND COMPUTER PROGRAM PRODUCT FOR IMPLEMENTING TRANSLATABLE TEXT IN USER MODIFIABLE SQL SCRIPTS

(75) Inventors: Mark John Anderson, Oronoco; David Allan Baldes; Peter John Johnson, both of Rochester; Michael Donald Pfeifer, Dodge Center, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/248,526

(22) Filed: Feb. 9, 1999

(51) Int. Cl.[7] .............................................. G06F 17/30
(52) U.S. Cl. ........................................................ 707/4
(58) Field of Search ............................... 707/4, 2, 3, 5, 707/203; 709/106, 201

(56) References Cited

U.S. PATENT DOCUMENTS

| | | | |
|---|---|---|---|
| 5,584,024 A | 12/1996 | Shwartz | 395/604 |
| 5,805,832 A | 9/1998 | Brown | 395/752 |
| 5,852,733 A | 12/1998 | Chien | 395/701 |
| 5,911,075 A | 6/1999 | Glaser | 395/704 |
| 5,950,190 A | 9/1999 | Yeager | 707/3 |
| 6,031,993 A | 2/2000 | Andrews | 395/707 |
| 6,128,612 A | 10/2000 | Brereton | 707/4 |

*Primary Examiner*—Jack M. Choules
*Assistant Examiner*—Cheryl Lewis
(74) *Attorney, Agent, or Firm*—Joan Pennington

(57) ABSTRACT

A method and computer program product are provided for implementing translatable text in user modifiable standard query language (SQL) scripts. A set of multiple queries are generated including comments and associated delimited names. The comments and associated delimited names are translated into multiple language versions. A user selected national language is identified. The user selected national language version of the translated comments and associated delimited names are utilized for generating a query. In accordance with features of the invention, the user is given the option to view the query and to make any desired modifications.

7 Claims, 5 Drawing Sheets

METHOD AND COMPUTER PROGRAM PRODUCT FOR IMPLEMENTING TRANSLATABLE TEXT IN USER MODIFIABLE SQL SCRIPTS

FIELD OF THE INVENTION

The present invention relates to the data processing field, and more particularly, relates to a method and computer program product for implementing translatable text in user modifiable structured query language (SQL) scripts.

DESCRIPTION OF THE RELATED ART

There are several situations where data are captured by an operating system or product and presented to a user on an intelligent workstation. For example, most database products have the ability to gather performance related data. That data usually are stored in database tables and then accessed through standard database protocols such as open database connection (ODBC) or Java database connection (JDBC). A user often needs to view such data in many different ways, for example, by job, by user, by operation, and the like, so most products ship a standard set of SQL queries to view the data in different ways. The problem is that no matter how many views a product ships, it is never sufficient because the number of views a user might wish to see are infinite.

A need exist for a mechanism for modifying the queries shipped with a product dynamically and in an open-ended way. It is desirable that the mechanism be intuitive and easy to use. It is desirable that the mechanism enables the user to work in his preferred national language.

As used in the following description and claims, the term structured query language (SQL) means any standard query language using coded statements to define queries.

SUMMARY OF THE INVENTION

A principal object of the present invention is to provide a method and computer program product for implementing translatable text in user modifiable standard query language (SQL) scripts.

In brief, a method and computer program product are provided for implementing translatable text in user modifiable standard query language (SQL) scripts. A set of multiple queries are generated including comments and associated delimited names. The comments and associated delimited names are translated into multiple language versions. A user selected national language is identified. The user selected national language version of the translated comments and associated delimited names are utilized for generating a query.

In accordance with features of the invention, the user is given the option to view the query and to make desired modifications.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
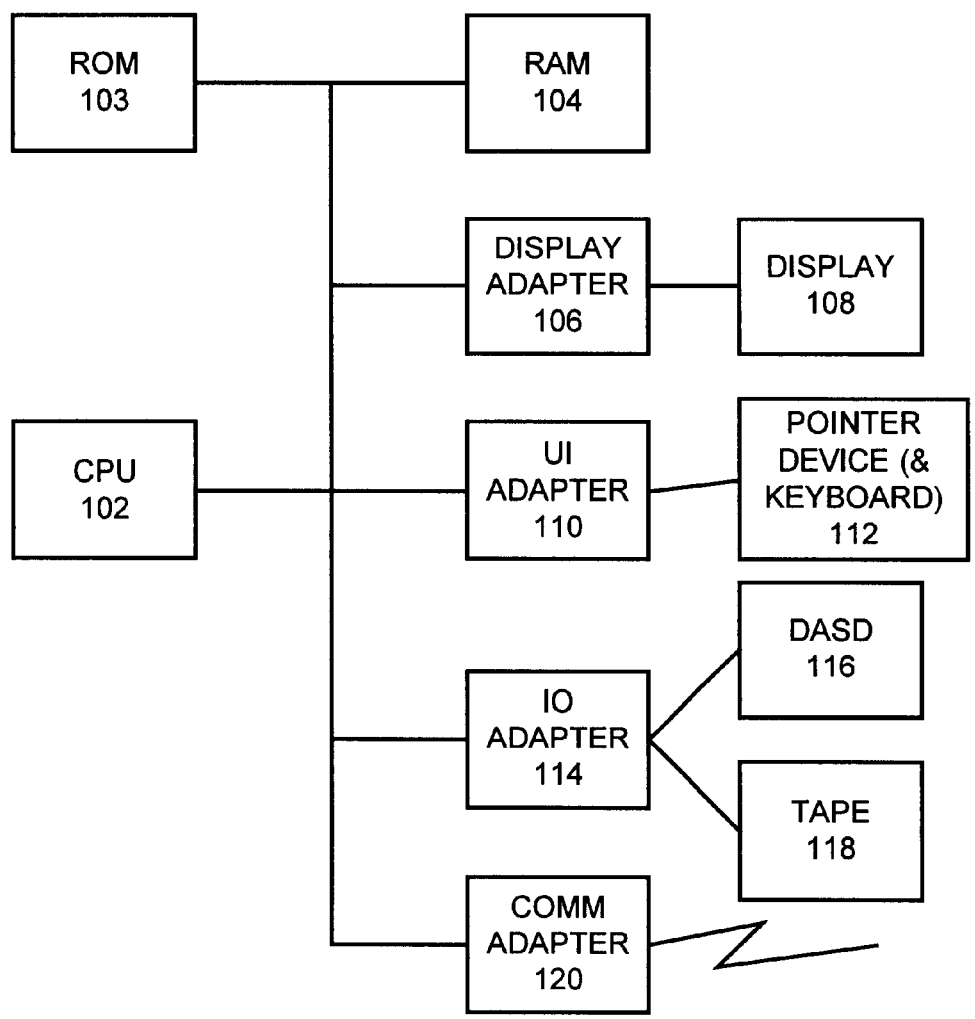
FIGS. 1 and 2 are block diagram representations illustrating a computer system and operating system for implementing a method and computer program product for implementing translatable text in user modifiable standard query language (SQL) scripts in accordance with the preferred embodiment.
Figure 2:
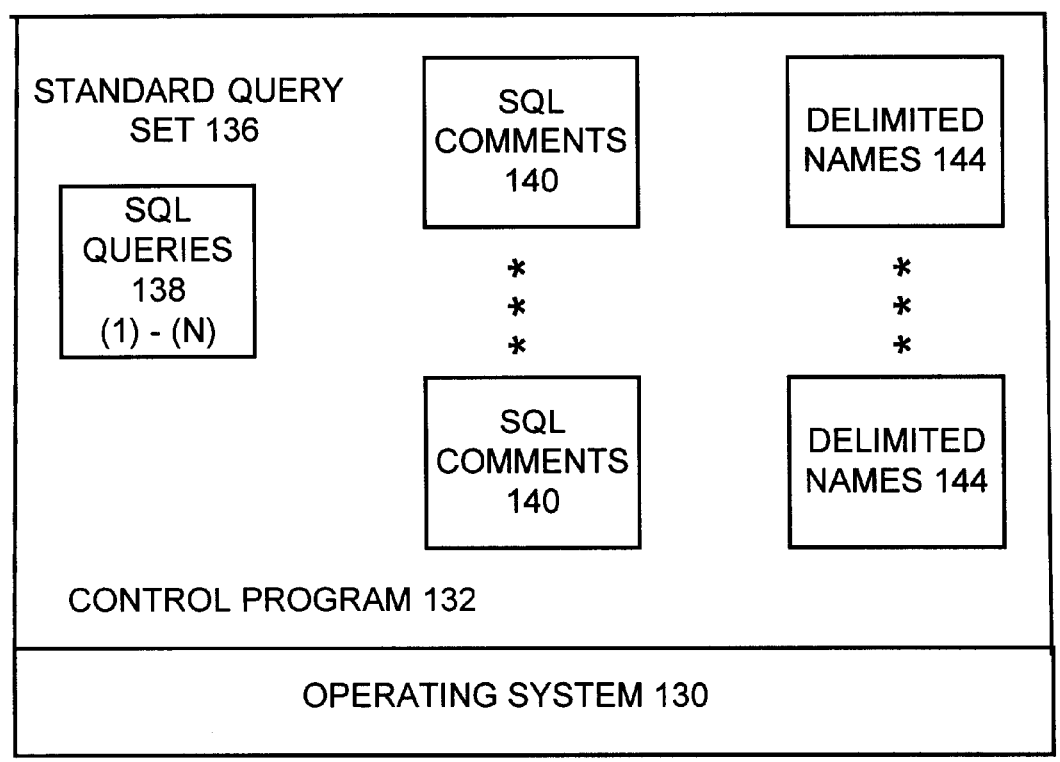

Having reference now to the drawings, in FIGS. 1 and 2, there is shown a computer or data processing system of the preferred embodiment generally designated by the reference character 100. As shown in FIG. 1, computer system 100 includes a central processor unit (CPU) 102, a read only memory 103, a random access memory 104, and a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1.

As shown in FIG. 2, computer system 100 includes an operating system 130, a control program 132 for implementing translatable text in user modifiable standard query language (SQL) scripts of the preferred embodiment. Computer system 100 includes a standard set 136 of multiple SQL queries 138 for viewing data in different ways. Computer system 100 includes SQL comments 140 and associated delimited names 144 stored separately from the SQL query set 136.

In accordance with features of the preferred embodiment, all SQL query source or SQL query set 136 shipped must use SQL comments 140 to document in easily understood terms the purpose of the query and throughout the query any additional information that helps in the understanding of the query or that part of the query. The SQL standards support two types of comments. In the preferred embodiment, the most useful type of comment for SQL comments 140 is the bracketed arrangement of comments (/* . . . */). This bracketed arrangement of SQL comments 140 delimits both the start and end of the comment so that the SQL comments 140 can span several lines.

In accordance with features of the preferred embodiment, each column of data that will be returned to the end user must use an associated delimited name 144 which is a name surrounded by quotes that describes the column of data in end user terms. It is critical that this is done because ODBC and JDBC do not have a way to return anything but a column name for a query sent to the server. In conventional arrangements even if column names on server itself are assigned by the product using delimited names, those names would be only in the national language of the server, not the client, and those names could not include notations resulting from derivations on the base tables.

In accordance with features of the preferred embodiment, a client can dynamically modify an associated delimited name 144 of viewed data. For example, assume that the time durations in the database tables are in milliseconds, the client may well want to view the data in seconds so would need to convert the data and then perhaps use a delimited name 144 that includes the units ("Total Runtime (sec)"). It is also important to note that delimited names allow embedded blanks so the resulting text will be even more useable to describe the viewed data in popular, easily understandable terms.

In accordance with features of the preferred embodiment, SQL comments 140 and delimited names 144 are shipped separately from the rest of the query source 136. This text of the SQL comments 140 and delimited names 144 is translated to N number of different language versions. A user installs his preferred language version which contains the translated text. The SQL statement is then constructed from the translated comments, delimited names, and the remainder of the untranslated SQL source. The user is given the option to view the query and make whatever modifications are necessary.

Figure 3:
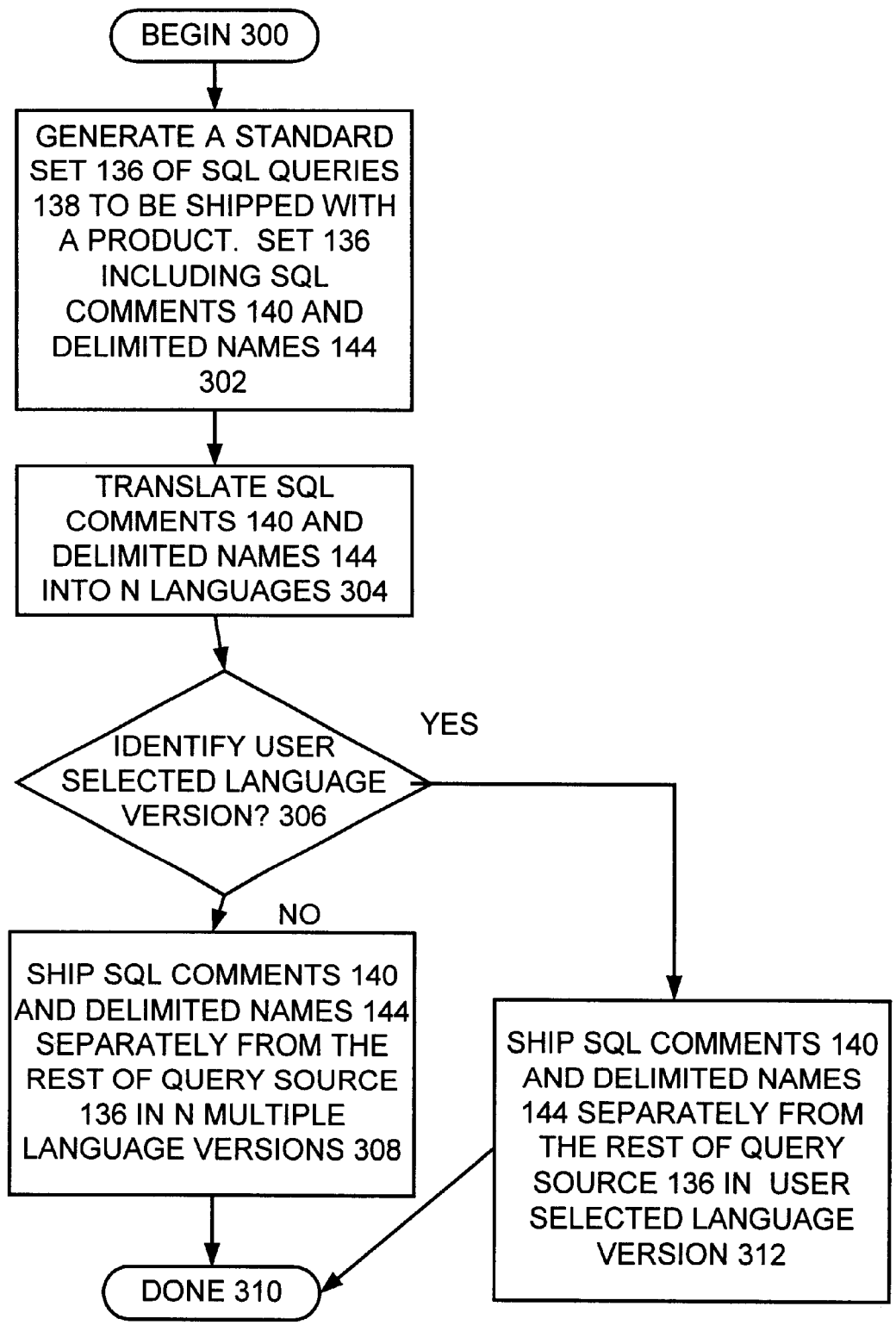
FIGS. 3 and 4 are flow charts illustrating exemplary steps for implementing translatable text in user modifiable standard query language (SQL) scripts in accordance with the preferred embodiment.
Figure 4:
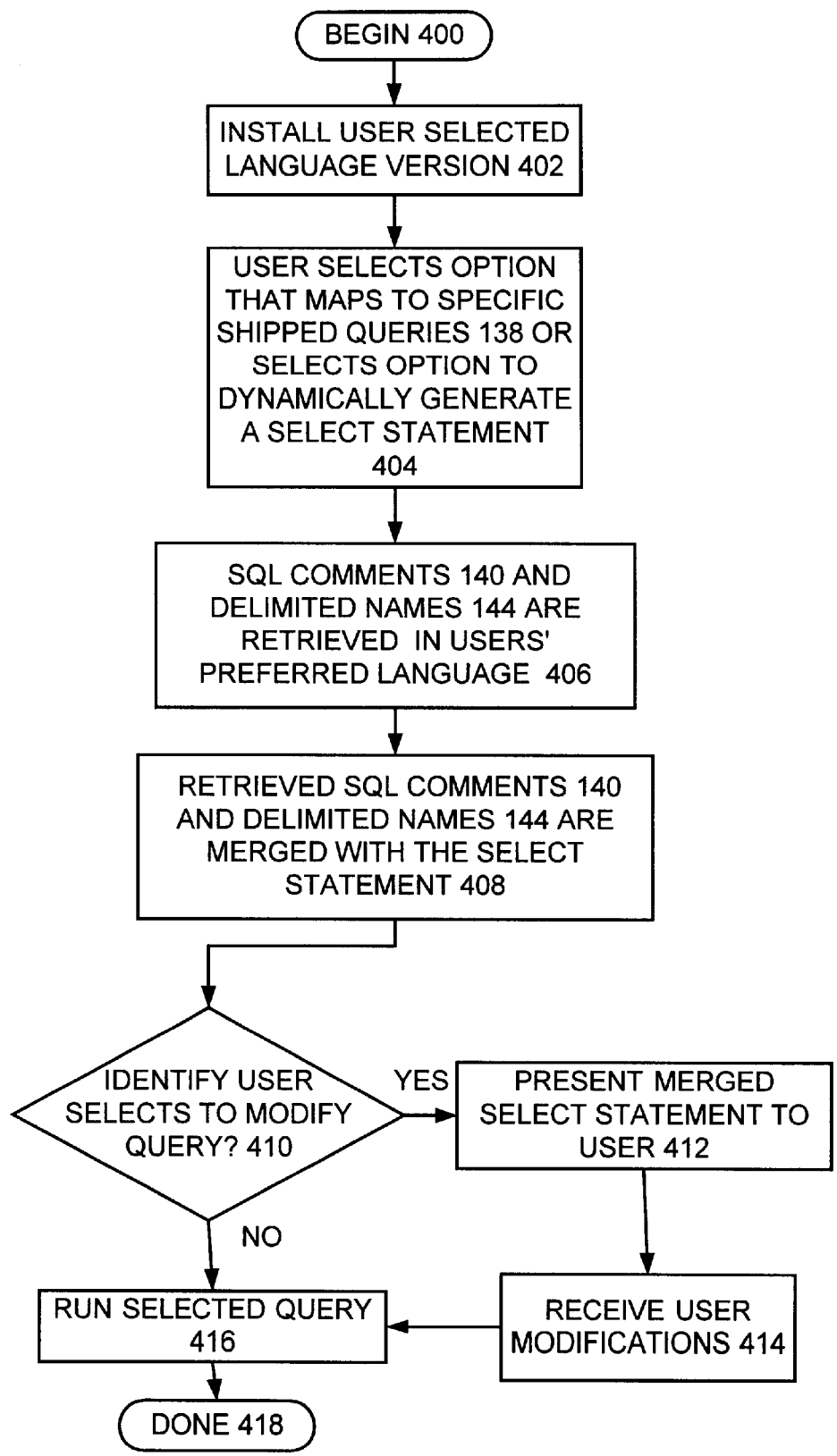

Referring now to FIGS. 3 and 4, there are shown exemplary steps for implementing translatable text in user modifiable standard query language (SQL) scripts in accordance with the preferred embodiment. In FIG. 3, exemplary steps for implementing translatable text in user modifiable standard query language (SQL) scripts in product development are shown starting at a block 300. A standard set 136 of SQL queries 138 are generated to be shipped with a product as indicated at a block 302. The generated set 136 of SQL queries 138 includes comments 140 and delimited names 144 of the preferred embodiment. The SQL comments 140 and delimited names 144 are translated into multiple (N) different, national language versions as indicated at a block 304. Checking for a user selected language version is provided as indicated at a decision block 306. If no user selected language version is identified, SQL comments 140 and delimited names 144 are shipped separately from the rest of the set 136 of SQL queries 138 in each of the multiple (N) different, national language versions as indicated at a block 308. This completes the operations as indicated at a block 310. Otherwise when a user selected language version is identified, SQL comments 140 and delimited names 144 are shipped separately from the rest of the set 136 of SQL queries 138 in the user selected language version as indicated at a block 310.

In FIG. 4, exemplary steps for implementing translatable text in user modifiable standard query language (SQL) scripts in product use by a client are shown starting at a block 400. A user selected language version is installed as indicated at a block 402. A user selects an option that maps to specific shipped queries 138 or selects an option to dynamically generate a select statement as indicated at a block 404. The SQL comments 140 and delimited names 144 are retrieved in the users' preferred language as indicated at a block 406. The retrieved SQL comments 140 and delimited names 144 are merged with the select statement as indicated at a block 408. A user selection to modify query is identified as indicated at a decision block 410. If the user selects to modify the query, the merged select statement which now constrains the translated SQL comments 140 and delimited names 144 is presented to the user as indicated at a block 412. User modifications are received as indicated at a block 414. The standard query or modified query is run as indicated at a block 416 to complete the operations as indicated at a block 418.

The following example of TABLE 1 illustrates the operation of the preferred embodiment. Note that the CASE expression is also used extensively to turn internal cryptic codes into something the user can understand. All comments 140 and delimited names 144 are translated into N languages. The SQL code is not translated because it is constant. At run time, the translated and non-translated text is merged and run.

TABLE 1

/* Database Performance Monitor Summary By Operation */
SELECT
/* Statement Identification */
CASE QQSTOP
WHEN 'AL' THEN 'ALTER TABLE'
WHEN 'CA' THEN 'CALL'
WHEN 'CD' THEN 'CREATE DISTINCT TYPE'
WHEN 'CF' THEN 'CREATE FUNCTION'
WHEN 'CL' THEN 'CLOSE'
WHEN 'CO' THEN 'COMMENT ON'
WHEN 'CM' THEN 'COMMIT'
WHEN 'CN' THEN 'CONNECT'
WHEN 'CC' THEN 'CREATE COLLECTION'
WHEN 'CI' THEN 'CREATE INDEX'
WHEN 'CP' THEN 'CREATE PROCEDURE'
WHEN 'CS' THEN 'CREATE ALIAS'
WHEN 'CT' THEN 'CREATE TABLE'
WHEN 'CV' THEN 'CREATE VIEW'
WHEN 'DC' THEN 'DECLARE CURSOR'
WHEN 'DE' THEN 'DESCRIBE'
WHEN 'DL' THEN 'DELETE'
WHEN 'DP' THEN 'DECLARE PROCEDURE'
WHEN 'DT' THEN 'DESCRIBE TABLE'
WHEN 'DI' THEN 'DISCONNECT'
WHEN 'DR' THEN 'DROP'
WHEN 'EX' THEN 'EXECUTE'
WHEN 'EI' THEN 'EXECUTE IMMEDIATE'
WHEN 'FC' THEN 'FETCH/CLOSE'
WHEN 'FE' THEN 'FETCH'
WHEN 'FL' THEN 'FREE LOCATOR'
WHEN 'GR' THEN 'GRANT'
WHEN 'IN' THEN 'INSERT'
WHEN 'LO' THEN 'LABEL ON'
WHEN 'LK' THEN 'LOCK'
WHEN 'OC' THEN 'OPEN/FETCH/CLOSE'
WHEN 'OD' THEN 'OPEN/FETCH/CLOSE/DELETE'
WHEN 'OF' THEN 'OPEN/FETCH'
WHEN 'OP' THEN 'OPEN'
WHEN 'OU' THEN 'OPEN/FETCH/CLOSE/UPDATE'
WHEN 'PR' THEN 'PREPARE'
WHEN 'RE' THEN 'RELEASE'
WHEN 'RT' THEN 'RENAME'
WHEN 'RV' THEN 'REVOKE'
WHEN 'RO' THEN 'ROLLBACK'
WHEN 'SI' THEN 'SELECT INTO'
WHEN 'SC' THEN 'SET CONNECTION'
WHEN 'SP' THEN 'SET PATH'
WHEN 'SR' THEN 'SET RESULTS'
WHEN 'ST' THEN 'SET TRANSACTION'
WHEN 'SV' THEN 'SET VARIABLE'
WHEN 'UP' THEN 'UPDATE'
ELSE QQSTOP
END as "Operation",
SUM(QQCNT) as "Total Statements",
/* Costs */
DECIMAL(SUM(DECIMAL(QQAVGT*QQCNT,15,0)/1000),18,3) as "Total Runtime (sec)",
DECIMAL(MAX(QQMAXT)/1000,18,3) as "Maximum Runtime",
DECIMAL(AVG(QQAVGT)/1000,18,3) as "Average Runtime",
DECIMAL(MAX(QQOPNT)/1000,18,3) as "Maximum Open Time",
DECIMAL(MAX(QQFETT/1000,18,3) as "Maximum Fetch Time",
DECIMAL(MAX(QQCLST)/1000,18,3) as "Maximum Close Time",
DECIMAL(MAX(QQOTHT)/1000,18,3) as "Maximum Other Time",
/*Opens*/
SUM(QQFULO) as "Total Full Opens",
SUM(QQPSUO) as "Total Pseudo Opens",
/*Implementation*/
SUM(QQCTS) as "Total Table Scans",
/*Index Information*/
DECIMAL(AVG(QQCIU),18,3) as "Average Indexes Used",
SUM(QQCIC) as "Total Indexes Created",
SUM(QQCIA) as "Total Index Creates Advised",
/*Copy of data*/
SUM(QQCTF) as "Temporary Tables",
SUM(QQCSO) as "Total Sorts",
/*Access Plan Rebuild*/
SUM(QQCAPR) as "Total Access Plans Rebuilt",
/*Row Sizes*/
MAX(QQTOTR) as "Maximum Table Rows", TABLE 1-continued

```
MAX(QQRROW) as "Maximum Result Rows",
NAX(QQARSS) as "Maximum Result Size",
DECIMAL(AVG(QQTOTR),18,3) as "Average Table Rows",
DECIMAL(AVG(QQRROW),18,3) as "Average Result Rows",
DECIMAL(AVG(QQARSS),18,3) as "Average Result Size",
FROM MJATST.QPM0000338
GROUP BY QQSTOP
ORDER BY "Total Runtime (sec)" DESC
```

Near the beginning of the above example of TABLE 1, two comments 140, /* Database Performance Monitor Summary By Operation */ and /* Statement Identification */ are provided, before the large select statement in SQL code 136. Then near the end of the above example of TABLE 1, multiple SQL comments 140 are provided to describe the results to be presented, such as /* Costs */ and /*Row Sizes*/. All SQL comments 140 are presented in the selected national language of the user or client. Multiple delimited names 144, such as, "Maximum Runtime", "Average Runtime", "Maximum Open Time", "Maximum Fetch Time", "Maximum Close Time", and "Maximum Other Time" are provided. A delimited name 144 is provided with each query result column presented in the selected national language of the user.

Providing an option or button where the user can dynamically modify the entire SQL query, as shown at blocks 410, 412, and 414 in FIG. 4, makes this solution completely open-ended. The user can change the columns selected, the order, the sort column, the predicates in the where clause, the grouping information, and the like. Since the SQL queries 138 are built with both translated textual comments 140 and translated delimited names 144 for each column of data, the method of the preferred embodiment is intuitive and easy to use because the user sees the information in his national language of choice.

Figure 5:
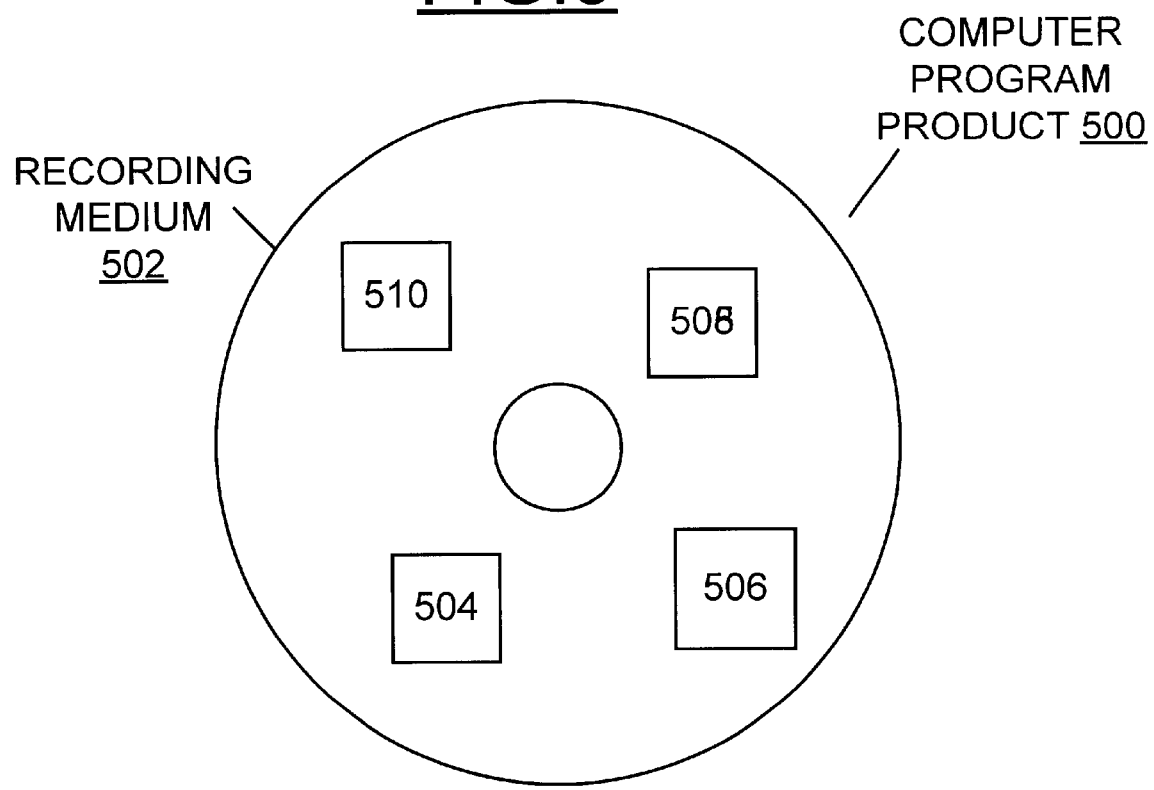
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the methods for implementing translatable text in user modifiable standard query language (SQL) scripts of the preferred embodiment in the system 100 of FIGS. 1 and 2.

A sequence of program instructions or a logical assembly of one or more interrelated modules defined by the recorded program means 504, 506, 508, 510, direct the computer system 100 for implementing translatable text in user modifiable standard query language (SQL) scripts of the preferred embodiment.

While the present invention has been described with reference to the details of the embodiments of the invention shown in the drawing, these details are not intended to limit the scope of the invention as claimed in the appended claims.

What is claimed is:

1. A method for implementing translatable text in user modifiable standard query language (SQL) scripts in a computer system comprising the steps of:

providing a set of multiple queries; said set of multiple queries including comments and associated delimited names;

translating said comments and associated delimited names into multiple language versions;

storing said translated comments and associated delimited names separately from each select statement defining said set of multiple queries;

identifying a user selected national language;

receiving a user selected option that maps to said set of multiple queries or selects an option to dynamically generate a select statement for generating a query;

retrieving said translated comments and associated delimited names in said identified user selected national language;

merging said retrieved translated comments and associated delimited names with each said select statement defining said set of multiple queries or said select statement for defining said query; and utilizing said query with said user selected national language of said translated comments and associated delimited name.

2. The method for implementing translatable text in user modifiable standard query language (SQL) scripts as recited in claim 1 includes the steps of identifying a user selection to modify said query and presenting said merged select statement to the user.

3. The method for implementing translatable text in user modifiable standard query language (SQL) scripts as recited in claim 2 includes the steps of receiving user selected modifications to said merged select statement.

4. A computer program product for implementing translatable text in user modifiable standard query language (SQL) scripts in a computer system comprising:

a recording medium;

means, recorded on the recording medium, for providing a set of multiple queries; said set of multiple queries including comments and associated delimited names;

means, recorded on the recording medium, for translating said comments and associated delimited names into multiple language versions;

means, recorded on the recording medium, for storing said translated comments and associated delimited names separately from each statement defining said set of multiple queries;

means, recorded on the recording medium, for identifying a user selected national language;

means, recorded on the recording medium, for receiving a user selected option that maps to said set of multiple queries or selects an option to dynamically generate a select statement for generating a query;

means, recorded on the recording medium, for retrieving comments and associated delimited names in said user selected national language and for merging said retrieved comments and associated delimited names with said statement defining said query; and means, recorded on the recording medium, for utilizing said query with said user selected national language of said translated comments and associated delimited names.

5. A computer program product as recited in claim 4 includes means, recorded on the recording medium, for identifying a user selection to modify said query and for presenting said merged select statement to the user.

6. A computer program product as recited in claim 5 includes said means, recorded on the recording medium, for receiving user selected modifications to said merged select statement.

7. A computer system comprising:

a processor, a memory coupled to the processor for storing a computer program product for implementing translatable text in user modifiable standard query language (SQL) scripts; said computer program product including a plurality of computer executable instructions stored on a computer readable medium, wherein said instructions, when executed by said computer, cause the computer to perform the steps of:

providing a set of multiple queries, each including comments and associated delimited names;

translating said comments and associated delimited names into multiple language versions;

storing said translated comments and associated delimited names separately from each statement defining said set of multiple queries;

identifying a user selected national language;

receiving a user selected option that maps to said set of multiple queries or selects an option to dynamically generate a select statement;

retrieving said translated comments and associated delimited names in said identified user selected national language;

merging said retrieved translated comments and associated delimited names with each said statement defining said set of multiple queries or said select statement for generating a query; and utilizing said generated query with said user selected national language of said translated comments and associated delimited names.

\* \* \* \* \*